United States Patent [19]
Lahiff

[11] 4,245,604
[45] Jan. 20, 1981

[54] NEUTRAL TO DRIVE TRANSIENT ENRICHMENT FOR AN ENGINE FUEL SUPPLY SYSTEM

[75] Inventor: John E. Lahiff, Farmington, Mich.

[73] Assignee: General Motors Corporation, Detroit, Mich.

[21] Appl. No.: 52,481

[22] Filed: Jun. 27, 1979

[51] Int. Cl.³ .................. F02B 3/00; B60K 21/00
[52] U.S. Cl. .................................. 123/478; 123/480; 123/486; 123/487; 74/860
[58] Field of Search ....... 123/32 EH, 32 EG, 32 EA, 123/32 ED, 32 EC; 74/860

[56] References Cited
U.S. PATENT DOCUMENTS

| | | | |
|---|---|---|---|
| 2,719,437 | 10/1955 | Nallinger | 74/860 |
| 3,742,785 | 7/1973 | Buck et al. | 74/860 |
| 3,893,432 | 7/1975 | Krupp et al. | 123/32 EB |
| 4,100,891 | 7/1978 | Williams | 123/32 EB |

Primary Examiner—P. S. Lall
Attorney, Agent, or Firm—Howard N. Conkey

[57] ABSTRACT

A system for providing acceleration enrichment in a vehicle engine fuel injection system is enabled by a sensed transition from a transmission neutral condition to a transmission drive condition to enrich the mixture supplied to the engine to provide improved engine performance.

3 Claims, 11 Drawing Figures

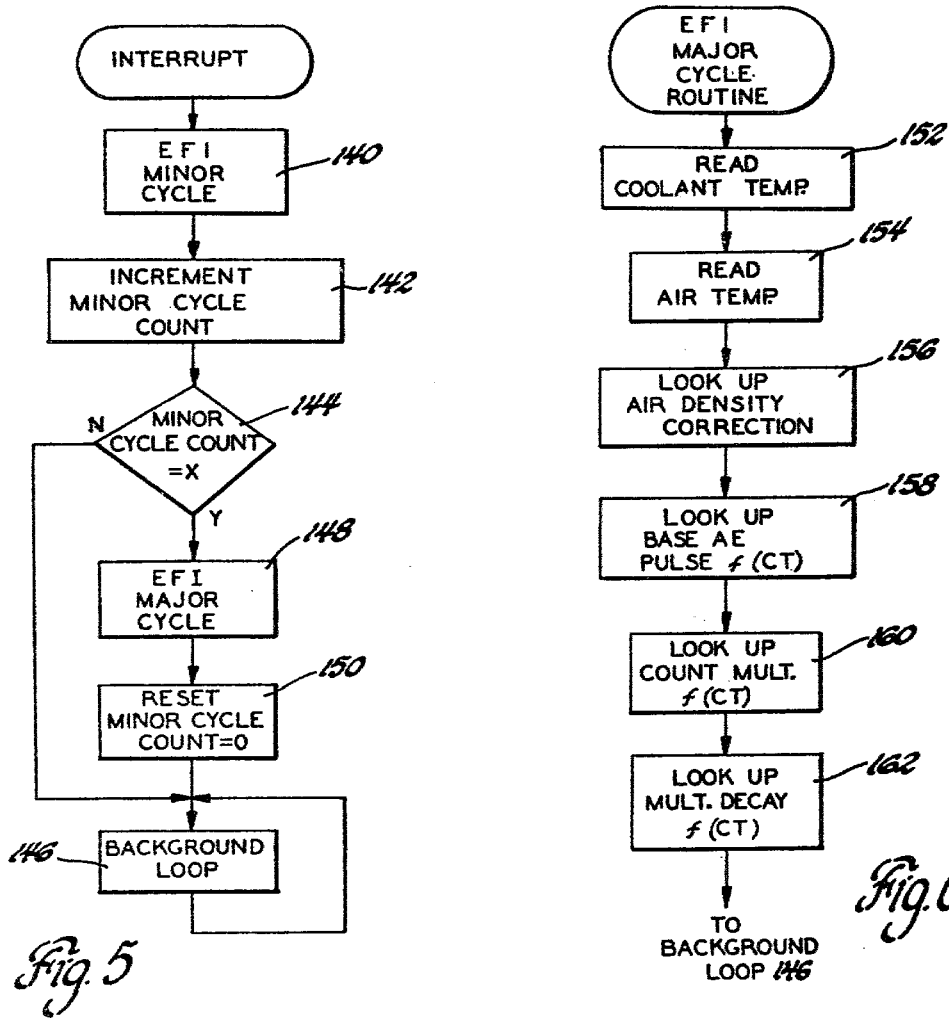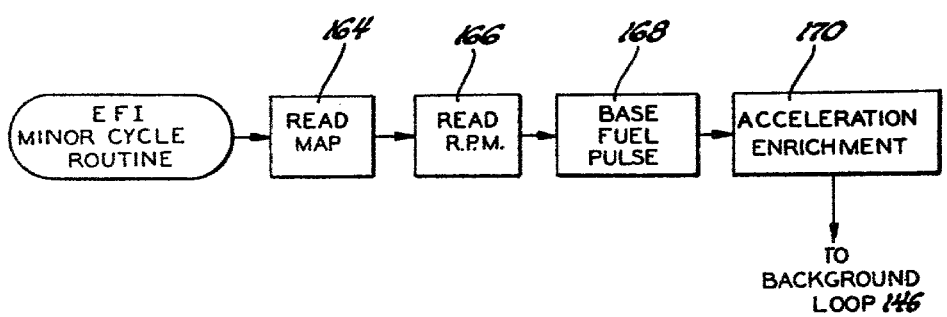

NEUTRAL TO DRIVE TRANSIENT ENRICHMENT FOR AN ENGINE FUEL SUPPLY SYSTEM

This invention is directed toward a fuel supply system for an internal combustion engine. During engine operation, when the vehicle transmission is shifted from park or neutral to reverse or forward gear, a lean air/fuel ratio excursion in the mixture drawn into the cylinders will typically result if the fuel supply rate is not increased beyond the normal steady state running fuel requirements. This is particularly the case in a synchronous throttle body fuel injection system where fuel is injected into the throttle body once for each cylinder intake event and then drawn into the intake manifold before entering the cylinders to undergo combustion. At the typical low engine speed that exists at the transmission transition from park or neutral to a drive gear, the aforementioned lean air/fuel ratio excursion may result in the engine stalling and in increased emissions.

One reason for the lean air/fuel ratio excursion is that the sudden load placed on the engine when the transmission is shifted to a drive gear reduces the engine speed resulting in an increase in the pressure in the intake manifold, assuming a constant throttle angle. Some of the air mass entering the intake manifold and cylinders remains in the manifold to bring the manifold pressure up to the new value dictated by the new lower engine speed. The determined fuel injection period based solely on the higher sensed manifold pressure value does not acount for the mass of air entering the manifold to bring the manifold pressure up to the new value. This unaccounted and unfueled air mass results in a lean air/fuel ratio excursion. The same effect is present in port injection systems to a lesser degree, the unaccounted and unfueled mass air being the amount required to increase the cylinder pressure to the new manifold pressure value.

In addition to the foregoing, the air/fuel ratio is further leaned as a result of increased fuel wetting of the throttle body and intake manifold during increasing values of manifold absolute pressure.

The amount of increased fuel required to obtain satisfactory engine operation during transmission neutral to drive transients is temperature dependent. For example, the degree of wall wetting previously referred to increases with decreasing values of engine temperature. Additionally, the mixture may be required to be richer for cold engine conditions to obtain satisfactory engine performance.

Fuel systems are known for providing enrichment of the mixture supplied to the engine during a sensed acceleration condition. Even though the acceleration enrichment may be provided as a function of parameters such as rate of change in manifold pressure, the sensed parameter may not vary in the amount or at the rate to initiate acceleration enrichment when the transmission is shifted to a drive gear even though such an enrichment is required for satisfactory engine performance.

It is an object of this invention to provide for an improved fuel supply system for an internal combustion engine wherein enrichment of the air/fuel ratio is provided in response to a transmission neutral condition to drive condition transient.

It is another object of this invention to provide a fuel injection system that provides acceleration enrichment in response to predetermined acceleration enrichment enabling criteria and that further provides air/fuel ratio enrichment in response to a transmission neutral condition to a drive condition transient by enabling the fuel injection to provide acceleration enrichment independent of the predetermined acceleration enrichment enabling criteria.

The invention may be best understood by reference to the following description of a preferred embodiment and the drawings in which:

FIGS. 1a thru 1d are graphs illustrating components of the air/fuel ratio enrichment signal that are a function of predetermined engine operating parameters;

FIGS. 5, 6, 7 and 8 are flow diagrams illustrative of the operation of the digital computer of FIG. 3 in accord with the principles of this invention.

Figure 3:
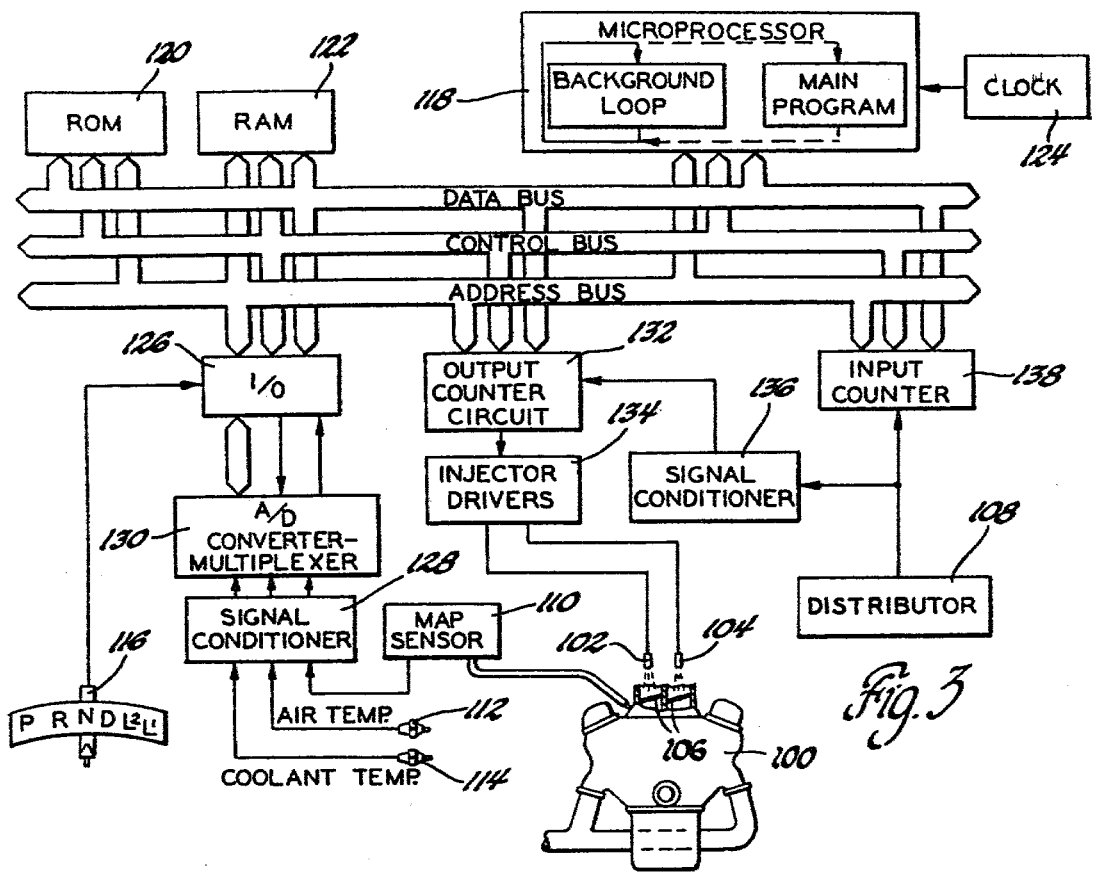
FIG. 3 illustrates a digital computer controlled fuel injection system for supplying fuel to an engine in accord with the principles of this invention.

Referring first to FIG. 3, a controlled air and fuel mixture is supplied to an internal combustion engine 100. While the invention is applicable to any air/fuel delivery apparatus including, for example, a port fuel injection system, the present embodiment of the invention employs a throttle body injection system including a pair of solenoid operated fuel injectors 102 and 104 which are mounted directly over a pair of throttle bores leading into the intake manifold of the engine 100. Fuel is supplied to the injectors 102 and 104 via conventional fuel supply means (not shown) at a constant pressure such as 10 psi. Fuel is injected into the throttle bores during the period that the fuel injectors 102 and 104 are energized by a voltage signal applied thereto.

Air is inducted through the throttle bores into the intake manifold of the engine 100 during operation. The density of air in the intake manifold at a given engine speed is controlled by a pair of throttle blades 106 located in the throttle bores, respectively. The angular position of the throttle blades 106 are controlled by the vehicle operator by means of conventional throttle linkages. In general, the air inducted into the intake manifold and the fuel injected by the fuel injectors 102 and 104 form a combustible mixture drawn into the cylinders of the engine 100 to undergo combustion.

The fuel injectors 102 and 104 are energized by a digital computer illustrated in FIG. 3 in response to predetermined engine operating parameters in order to supply the fuel requirements of the engine 100. In the present embodiment, for the normal running fuel requirements, the injectors 102 and 104 are simultaneously energized by the digital computer once for each intake event for a total of four injection pulses per engine revolution in an 8 cylinder engine. The digital computer is responsive to a signal output of the engine distributor 108 to provide for the timing of the injection and is responsive to the output of a manifold absolute pressure sensor 110 pneumatically coupled with the intake manifold of the engine 100, the output of a temperature sensor 112 measuring the air temperature of the air entering the intake manifold of the engine 100 and a coolant temperature sensor 114 responsive to the engine coolant temperature to control the time of each injection event so as to provide the fuel requirements of the engine 100. Additionally, the digital computer receives the output of a neutral/park switch 116 representing the engine gear selector being in its park or neutral position. In accord with this invention, the digital computer responds to the output of the neutral/park switch 116 to provide for mixture enrichment when the transmission is shifted from a neutral condition (neutral or park) to a drive condition (forward or reverse) to thereby provide improved emissions and engine performance when the vehicle transmission is shifted from a neutral condition to a drive condition.

The digital computer for controlling the fuel injectors 102 and 104 to provide fuel to the engine 100 includes a microprocessor 118 which controls the energization of the fuel injectors 102 and 104 by executing an operating program which is permanently stored in an external read only memory (ROM) 120. The digital system also includes a random access memory (RAM) 122 into which data may be temporarily stored and from which data may be read at address locations determined in accord with the computer program stored in the ROM 120. A clock oscillator 124 supplies a clock signal to the microprocessor 118 which establishes the timing of the digital computer operation. Internal to the microprocessor 118 are the conventional microprocessor elements including counters, registers, accumulators, etc. Such a microprocessor may take the form of a Motorola MC 6800 series microprocessor.

The input conditions upon which the control of the injectors 102 and 104 are based are read under control of the program in the ROM 120 via a conventional input/output circuit 126. The park/neutral discrete input from the switch 116 is coupled to a discrete input terminal of the input/output circuit 126. The analog signals from the manifold absolute pressure sensor 110 and the temperature sensors 112 and 114 are coupled to a signal conditioner 128 whose outputs are coupled to an analog-to-digital converter-multiplexer 130. The particular analog condition to be sampled and converted is controlled by the microprocessor 118 via the address lines from the input/output circuit 126. Upon command, the value of the addressed condition is converted to a digital form and supplied to the input/output circuit 126 and then stored at a respective memory location in the RAM 122 determined by the computer program in the ROM 120.

The output of the digital system, comprised of a pulse having a width determined in accord with the sensed engine parameters, is provided via an output counter circuit 132 which supplies pulses to injector drivers 134 for energizing the fuel injectors 102 and 104. During steady state engine conditions, the pulses supplied to the injectors 102 and 104 are issued once for each intake event as determined by the crankshaft position signal provided by the distributor 108. This signal is applied through a signal conditioner 136 to the output counter circuit 132 to initiate the normal fuel injection signal at predetermined engine crankshaft positions.

Additionally, the pulse output of the distributor 108 is coupled to a conventional input counter 138 which counts clock pulses for the duration between pulse outputs of the distributor 108 to provide an indication of engine speed.

The microprocessor 118, the ROM 120, the RAM 122, the input/output circuit 126, the output counter circuit 132 and the input counter 138 are interconnected by an address bus, a data bus and a control bus. The microprocessor 118 accesses the various circuits and memory locations in the ROM and RAM via the address bus. Information is transmitted between the circuits via the data bus and the control bus includes lines such as read/write lines, reset lines, clock lines, etc.

As previously indicated, the microprocessor 118 reads the data and controls the operation of the fuel injectors 102 and 104 by execution of the operating program provided by the ROM 120. Under control of the program, the engine operating parameters previously referred to are read and stored in designated locations in the RAM 122 and the calculations are performed for determining the steady state and transient fuel requirements of the engine 100.

In general, the controller of FIG. 3 determines the steady state fuel requirement of the engine 100 in the form of an injection duration each 8 milliseconds based on the manifold absolute pressure and engine speed with the determined value being compensated for air density based on air temperature. After each 8 millisecond calculation, the steady state fuel pulse width value is placed in a register in the output counter circuit 132. Upon the occurrence of a pulse output from the distributor 108, the then existing pulse width requirement in the register of the output counter circuit 132 is transferred to a counter which is counted down to provide the required output pulse duration timing. A pulse for this duration is supplied to the injector drivers 134 to energize the fuel injectors 102 and 104. Additionally, each 8 milliseconds, the digital controller further determines if the conditions for air/fuel ratio enrichment are present and, if so, provides an output pulse to the injectors as will be described.

While other parameters such as rate of change in throttle angle may be utilized to determine a requirement for acceleration enrichment, the present embodiment utilizes rate of change of engine intake manifold absolute pressure (MAP) to determine the requirement for acceleration enrichment. When the rate of change in MAP exceeds a predetermined value, the digital controller supplies a pulse to the fuel injectors 102 and 104 each 8 milliseconds having a duration determined in accord with the engine temperature and the rate of change of manifold pressure with the number of consecutive acceleration enrichment pulses being determined as a function of engine temperature and the change in MAP. Additionally, when a transmission neutral to drive transient is detected, the digital controller supplies a pulse to the fuel injectors 102 and 104 each 8 milliseconds having a duration determined partially by engine temperature with the number of consecutive pulses being determined by engine temperature and the change in MAP.

Figure 1A:
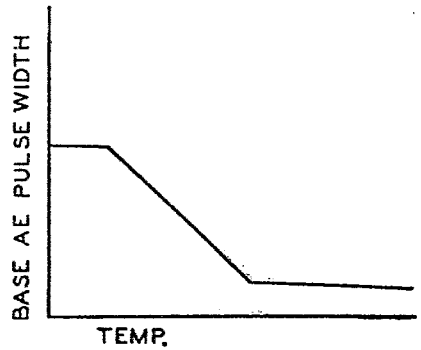
Figure 1B:
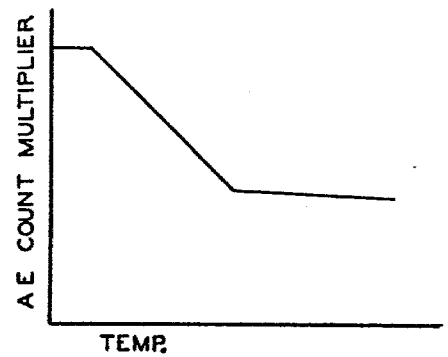
Figure 1C:
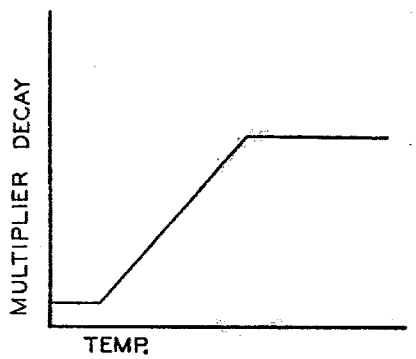
Figure 1D:
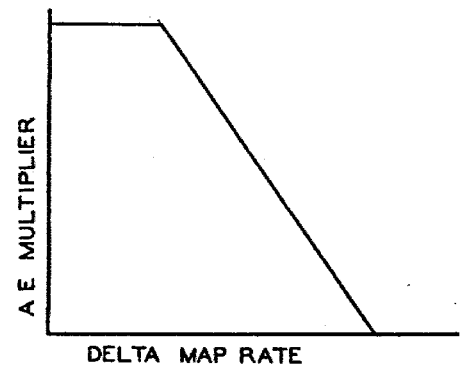
Figure 2:
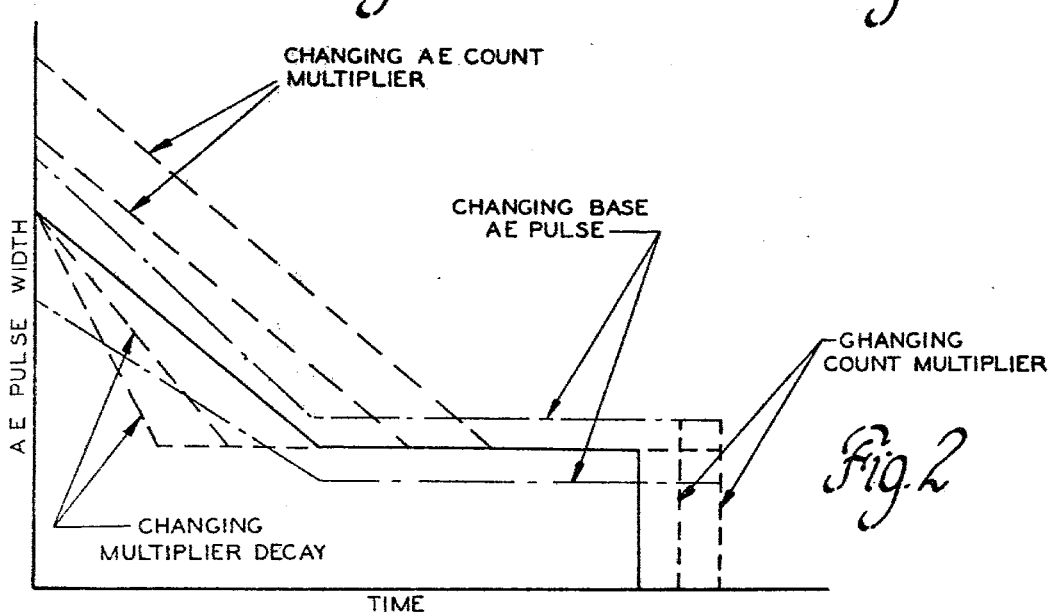
FIG. 2 is a graph illustrating the profile of the air/fuel ratio enrichment as a function of the components illustrated in FIGS. 1a thru 1d.

Referring to FIGS. 1 and 2, the acceleration enrichment is illustrated. When the sensed rate of change of manifold pressure is greater than a predetermined value, the acceleration enrichment amount is determined to be equal to a base AE pulse width value determined by coolant temperature in accord with the function illustrated in FIG. 1a multiplied by an AE multiplier having an initial value equal to or greater than unity determined by the rate of change in MAP in accord with the function illustrated in FIG. 1d. The acceleration enrichment multiplier is decayed toward unity over time at a rate determined by coolant temperature in accord with the function illustrated in FIG. 1c. The duration of acceleration enrichment in the form of the number of acceleration enrichment pulses issued is determined by the change in MAP and by coolant temperature in accord with the function illustrated in FIG. 1b.

The resulting acceleration enrichment profile is illustrated in FIG. 2. The solid line is representative of a predetermined set of engine input conditions of temperature, MAP change and MAP rate of change. The various broken lines are representative of the changing profile of the acceleration enrichment as a function of varying MAP change rates and engine temperatures. It can be seen from the varying enrichment profiles of FIG. 2 that by making each of the functions illustrated in FIGS. 1a through 1d specific to a particular engine, the acceleration enrichment provided may be specifically tailored to the complex engine requirements to thereby provide substantially optimum engine performance and emissions.

The functions illustrated in FIGS. 1a through 1d are stored in the ROM 120 in the form of four two dimensional lookup tables which are addressed in accord with coolant temperature or MAP rate of change to determine the particular acceleration enrichment profile required by the then existing engine conditions.

Referring to FIGS. 5 through 8, there is illustrated the flow charts of the computer program for providing the steady state and enrichment pulses to the fuel injectors 102 and 104. Referring first to FIG. 5, there is illustrated the general computer program which is executed each 8 milliseconds by the microprocessor 118. At each 8 milliseconds, an interrupt is provided by a timer in the microprocessor 118 to begin the program cycle. Following the 8 millisecond interrupt, the program cycle proceeds to an electronic fuel injection (EFI) minor cycle routine 140 wherein the steady state fuel requirement and acceleration enrichment fuel requirement, if required, are determined and outputted to respective registers in the output counter circuit 132. Additionally, during the EFI minor cycle routine 140, rapidly changing engine parameters such as MAP and engine speed are determined and stored in appropriate memory locations in the RAM 122.

Following the EFI minor cycle routine 140, the program cycle proceeds to step 142 where a minor cycle count in a designated RAM location is incremented. Thereafter, the program cycle proceeds to decision point 144 where the minor cycle count resulting from step 142 is compared with a constant value X. If the minor cycle count is less than the value X, the program cycle proceeds to a background loop 146 where the program awaits the next 8 millisecond interrupt. If, however, at decision point 144 the minor cycle count is equal to the value X, the program cycle proceeds to step 148 wherein an electronic fuel injection (EFI) major cycle routine is executed. During this major cycle routine, various engine conditions and values are determined which are generally slowly changing and are not required to be updated at each 8 millisecond period. For example, during the EFI major cycle routine 148, engine coolant temperature and air temperature are read and stored in ROM designated locations in the RAM 122 and the acceleration enrichment functions illustrated in FIG. 1 that are based on coolant temperature are looked up in the appropriate lookup tables in the ROM 120 and stored in ROM designated locations in the RAM 122. Thereafter, the minor cycle count at the respective RAM location is reset to zero and the program proceeds to the background loop 146 to await the occurrence of the next 8 millisecond interrupt. As can be seen, the value X determines the frequency that the EFI major cycle routine 148 is performed. For example, the value X may be 32 so that the EFI major cycle routine 148 is executed approximately every ¼ sec.

Referring to FIG. 6, the EFI major cycle routine 148 is illustrated. The program cycle first proceeds to step 152 where the value of the engine coolant temperature provided by the sensor 114 is read and stored in the RAM at a ROM designated location. Thereafter, the program proceeds to step 154 where the value of air temperature is similarly stored in the RAM 122. At step 156, the air density correction to the steady state fuel requirement is determined by looking up the appropriate correction factor in the ROM 120 based on the previously read air temperature value. This density correction factor is temporarily stored in a designated location in the RAM 122. The program cycle then proceeds to step 158 where the base AE pulse width previously referred to is read from the lookup table address in the ROM 120 determined by the coolant temperature read at step 152. This value is then temporarily stored in the RAM 122. Thereafter, the computer cycle proceeds to steps 160 and 162 where the AE count multiplier previously referred to is retrieved from the respective lookup table in the ROM 120 at the address determined by coolant temperature and the AE multiplier previously described is retrieved from the lookup table in the ROM 120 at the address determined by MAP rate of change. The values retrieved are stored in respective memory locations in the RAM 122.

Referring to FIG. 7, the general form of the minor cycle routine 140 is illustrated. When the minor cycle routine is initiated, the values of MAP and speed are read and stored in respective RAM locations at steps 164 and 166 respectively. As previously indicated, these values are read at 8 millisecond intervals since they may change substantially more rapidly than the other parameters read during the slow EFI major cycle routine 148. The program cycle then proceeds to step 168 where the base fuel pulse width is computed which represents the duration that the injectors 102 and 104 are to be energized during each intake event in order to obtain the desired air/fuel ratio. Typically, the base fuel pulse may be determined via a three dimensional lookup table in the ROM 120 that is addressable as a function of the values of MAP and speed read at steps 164 and 166. The resulting value obtained from the lookup table may then be compensated for air density as a function of the air temperature read during step 154 in the EFI major cycle routine. The determined base fuel pulse width is inserted into a register in the output counter circuit 132. While the base fuel pulse width is calculated each 8 millisecond interval during each minor cycle routine, the determined pulse width may vary between actual injection periods as a result of changing values of MAP or speed. However, at the time fuel injection is initiated, the then existing computed pulse width stored in the register in the output counter circuit 132 is utilized to energize the injectors 102 and 104 for the determined duration.

Following the calculation of the base fuel pulse width at step 168, the program proceeds to the acceleration enrichment routine 170 which provides for enrichment in response to a sensed acceleration or a transmission neutral condition to drive condition transient in accord with the principles of this invention. Following the acceleration enrichment routine, the program proceeds to the background loop where it awaits the occurrence of the next 8 millisecond interrupt.

Figure 8:
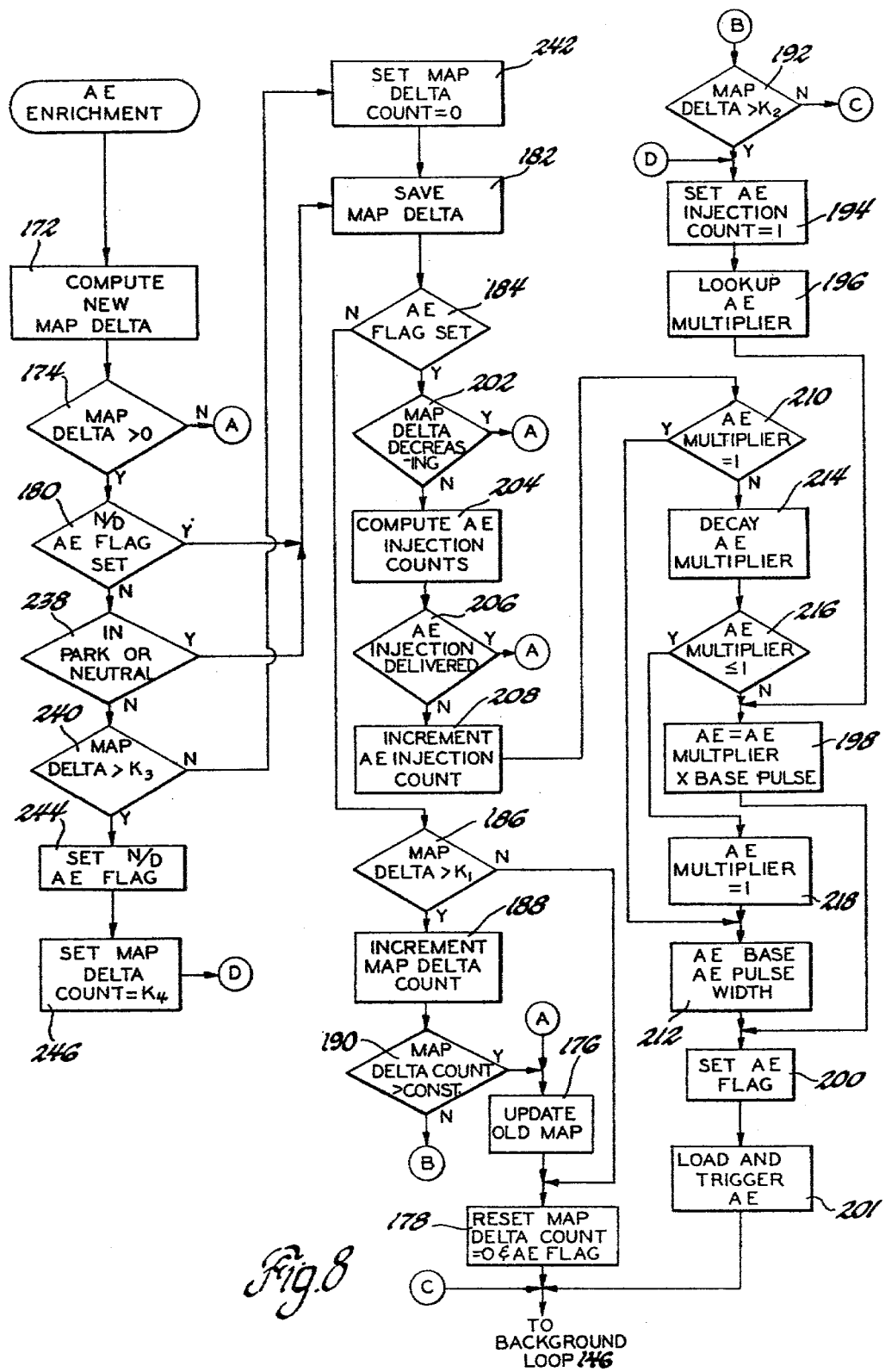

Referring to FIG. 8, the acceleration enrichment routine 170 is illustrated. After entering the acceleration enrichment routine, the program proceeds to step 172 where a previously stored MAP value, hereinafter referred to as old MAP is substrated from the most recently measured value of MAP (new MAP) as determined at step 164 of FIG. 7. This computed change in MAP will hereinafter be referred to as MAP delta. This new MAP delta value is stored in a ROM designated RAM location. At decision point 174, the computed MAP delta is compared to zero. If the difference is zero or negative representing a steady state or a decelerating transient condition, the program proceeds to step 176 where the new MAP value is stored in the old MAP storage location in the RAM thereby updating the old MAP value to be used when the acceleration enrichment routine is again executed. The program then proceeds to reset a MAP delta count at a ROM designated location in the RAM 122 which contains a number representing the number of 8 millisecond EFI minor cycle periods that have elapsed since the MAP delta determined at step 172 exceeded a small value $k_1$. The number of this count and the MAP delta value are representative of the rate of change in MAP to be utilized in the acceleration enrichment routine as will hereinafter be described. Following step 178, the program cycle exits the EFI minor cycle routine 140 and proceeds to the background loop to await the next 8 millisecond interrupt.

If at step 174 the computed MAP delta is greater than zero representing an acceleration transient condition, the program cycle proceeds to decision point 180 where a neutral to drive (N/D) acceleration enrichment flag location in the RAM 122 is sampled. It will be assumed for the time being that the N/D acceleration enrichment flag is set indicating that a transmission neutral to drive transient acceleration enrichment has been executed in accord with this invention as will be described so that the program cycle then proceeds to step 182 where the MAP delta value determined in the prior 8 millisecond minor cycle is stored in a temporary MAP delta location in the RAM 122. Thereafter, the new MAP delta value is inserted into the old MAP delta location in the RAM 122.

The program then proceeds to decision point 184 where an acceleration enrichment flag memory location in the RAM 122 is sampled. If the acceleration enrichment flag is not set indicating that acceleration enrichment is not in progress, the program cycle proceeds to decision point 186 where the new MAP delta determined at step 172 is compared with a constant $k_1$. If the MAP delta is not greater than the constant $k_1$ representing a substantially small change in MAP for MAP noise filtering, the program cycle proceeds to the step 178 where the MAP delta count is reset to zero as previously described after which the program returns to the background loop. If at decision point 186 the MAP delta determined at step 172 is greater than the value $k_1$, the MAP delta count in the respective RAM location is incremented. As previously indicated, the MAP delta count represents the number of EFI minor loops that have been executed since the MAP delta value exceeded the value $k_1$.

Following the step 188, the MAP delta count is sampled at decision point 190. If the count represents that a predetermined time duration has expired, the program cycle proceeds to the step 176 where the old MAP value is updated as previously described. Thereafter, the MAP delta count is again reset to zero and the program returns to the background loop. However, if at decision point 190 the MAP delta count does not represent that the predetermined time duration has expired, the program proceeds to decision point 192 to determine whether the MAP delta value is greater than a value $k_2$ that is greater than the value $k_1$. If the MAP delta value is less than $k_2$, the program cycle proceeds to the background loop 146. However, if the MAP delta value is greater than the constant $k_2$, the engine operating conditions now exist requiring acceleration enrichment. These conditions are as follows: The MAP has increased by an amount $k_2$ minus $k_1$ before the expiration of a predetermined number of 8 millisecond EFI minor loops represented by the MAP delta count. These conditions represent a rate of change in MAP at least greater than a predetermined value determined by the predetermined MAP delta count utilized at decision point 190 and the values $k_1$ and $k_2$. If the conditions exist requiring acceleration enrichment, the program cycle proceeds to step 194 where an acceleration enrichment injection count at a ROM designated RAM location is set equal to 1. This count is representative of the number of acceleration enrichment pulses that have been issued since acceleration enrichment was initiated and is therefore representative of acceleration enrichment duration.

The computer program next proceeds to step 196 wherein the value of the AE multiplier referred to with respect to FIGS. 1d and 2 is obtained from the lookup table in the ROM 120 as a function of the rate of change in MAP as represented by the MAP delta count obtained at step 188. This AE multiplier, which is equal to or greater than unity, is then multiplied at step 198 with the base AE pulse width determined at step 158 in the EFI major cycle. The resulting product is the initial duration of the acceleration enrichment fuel pulse to be issued by the injectors 102 and 104. Thereafter at step 200, the acceleration enrichment flag location in the RAM is set to indicate that acceleration enrichment is in progress. The computed acceleration enrichment pulse width is then inserted into a register in the output counter circuit 132 and the acceleration enrichment fuel pulse is caused to be issued at step 201. The program then returns to the background loop 146.

Upon the occurrence of the next 8 millisecond interrupt, the program cycle again executes the acceleration enrichment routine during the EFI minor cycle. When the acceleration enrichment routine is again initiated, a new MAP delta value is determined as previously described.

If at step 174 the MAP delta is zero or negative the program proceeds to steps 176 and 178 to update the old MAP value to the value determined at step 164 and to reset the MAP delta count and AE flag to terminate acceleration enrichment. If at step 174 the MAP is greater than zero, the program proceeds to steps 180 and 182 as previously described. At decision point 184 the state of the acceleration enrichment flag in the RAM 122 is sampled. Since the flag was previously set at step 200, the program cycle proceeds to decision point 202 where the computer determines if the most recently computed MAP delta (new MAP delta) is less than the previously computed MAP delta (stored in the temporary MAP delta location in the RAM at step 182). If the MAP delta value is decreasing, the computer program proceeds to step 176 where the old MAP value is updated with the most recently measured MAP value and to step 178 where the MAP delta count and acceleration enrichment flag are reset to terminate acceleration enrichment. Thereafter, the program then returns to the background loop 146.

If at point 202 in the program cycle it is determined that the MAP delta is not decreasing, the computer proceeds to step 204 where the duration of the acceleration enrichment determined by the existing engine operating conditions is determined. The duration of the acceleration enrichment is equal to the new MAP delta value determined at step 172 times the AE count multiplier value determined by coolant temperature as described with respect to FIGS. 1b and 2. The value of the AE count multiplier is obtained from the lookup table in the ROM 120 at an address location determined by coolant temperature. The program then proceeds to decision point 206 where an AE injection count, which is the number of injection pulses delivered, is compared to the number of injection pulses required as determined at the previous step 204. If they are equal, the acceleration enrichment duration is equal to the required duration and the program proceeds to step 176 where the old MAP is updated and to step 178 where the delta count and acceleration enrichment flags are reset and acceleration enrichment is terminated. However, if the number of acceleration injection pulses delivered are not yet equal to the required number of pulses, the program proceeds to step 208 where the number of injection pulses delivered are totalized by incrementing the injection count in a ROM designated RAM location.

At decision point 210, the existing value of the AE multiplier is compared to 1. If the multiplier is equal to 1, the program cycle proceeds to step 212 wherein the acceleration enrichment pulse duration is made equal to the base AE pulse width determined at step 158 in the EFI major cycle routine. However, if the AE multiplier is greater than 1, the program proceeds to step 214 where the AE multiplier is decayed in accord with the multiplier decay which was read from the ROM 120 lookup table at step 162 in the EFI major cycle routine. After the AE multiplier is decayed at step 214, the multiplier is again compared to 1 at step 216. If the multiplier is now less than or equal to 1, the program proceeds to step 218 where it is set equal to 1 so that at step 212 the acceleration enrichment pulse duration is set equal to the base pulse width. However, if at step 216 the AE multiplier value is determined to be greater than 1, the acceleration enrichment pulse duration is made equal to the AE multiplier times the base AE pulse width determined at step 158 in the EFI major cycle routine. Thereafter, the program again executes steps 200 and 201 to trigger the acceleration enrichment pulse. The program then returns to the background loop 146.

When acceleration enrichment is initiated, the acceleration enrichment pulse width decreases according to the profile illustrated in FIG. 2 and at a rate determined by the multiplier decay function illustrated in FIG. 1c until the acceleration enrichment multiplier determined initially in accord with the function of FIG. 1d is decayed to 1 at which time the acceleration enrichment is equal to the base AE pulse width. The number of acceleration enrichment pulses defining the duration of acceleration enrichment is equal to the number of pulses determined in accord with the AE count multiplier illustrated by the function of FIG. 1b.

Figure 4:
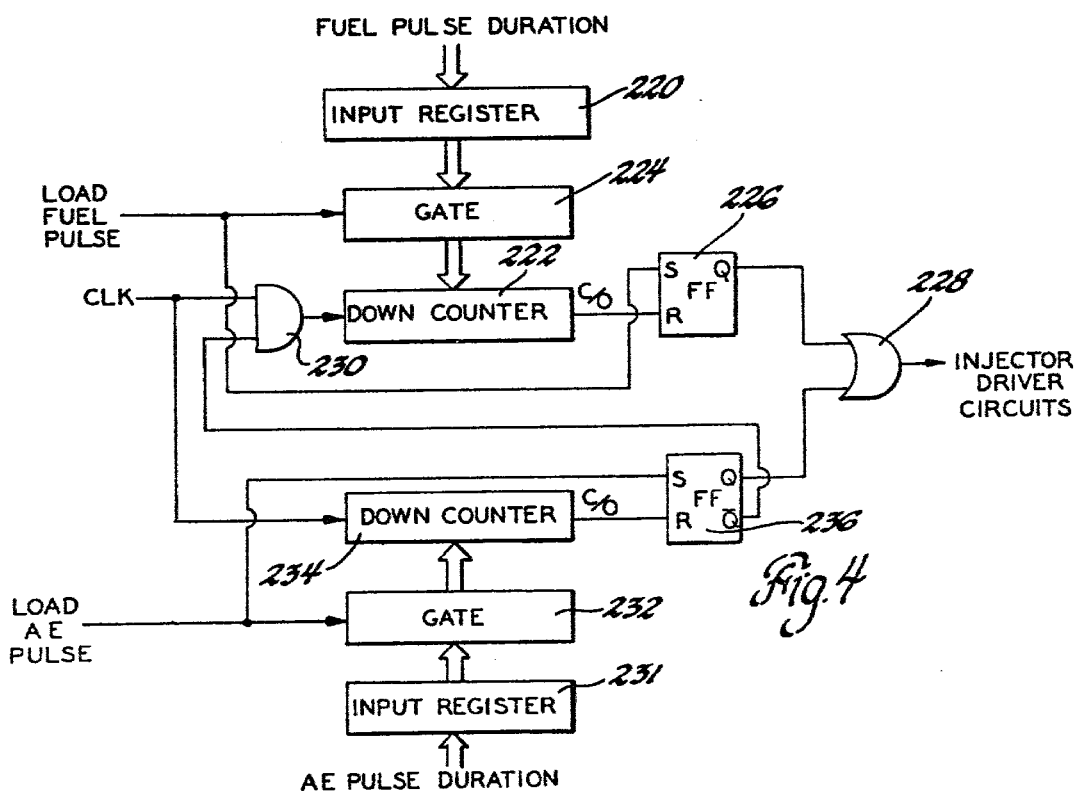
FIG. 4 is a diagram illustrating an output counter arrangement for summing the normal and enrichment pulses for energizing the fuel injectors of FIG. 3.

Referring to FIG. 4, there is illustrated a general form of one embodiment of the output counter circuit 132 of FIG. 3 which provides pulses to energize the injectors 102 and 104 in accord with the steady state and transient fuel requirements of the engine 100 as determined in the manner previously described. During each EFI minor cycle routine, the base fuel pulse width (in the form of a binary number) for steady state engine running determined at step 168 is loaded into an input register 220 by the microprocessor 118. The determined base fuel pulse width in the input register 220 is gated into a down counter 222 through a gate 224 which is enabled by load fuel pulses which are synchronous with the pulse outputs of the distributor 108. Consequently, even though the input register 220 is updated each 8 milliseconds in accord with the fuel requirements of the engine 100, the down counter 222 is loaded to provide for a fuel injection pulse only during the periods determined by the crankshaft position represented by the output of the distributor 108. The load fuel pulse further functions to set an output flip flop 226 whose Q output shifts to a digital logic 1 and which is applied to one input of an OR gate 228. The output of the OR gate 228 which is a logic 1 when any of its inputs is a logic 1 is coupled to the injector driver circuit 134 of FIG. 3 whose outputs function to energize the injectors 102 and 104 for the duration of a logic 1 output of the gate 228. The binary number loaded into the down counter 222 is counted down by clock pulses applied thereto through an AND gate 230 unless inhibited during an acceleration enrichment pulse as will be described. When the down counter 222 is counted down to zero, a carry out signal therefrom resets the flip flop 226 whose Q output shifts to a digital logic 0 resulting in the output of the OR gate 228 shifting to a digital logic 0 to terminate the fuel injection pulse. The foregoing cycle is continually repeated in accord with the pulse output of the distributor 108 to provide for the steady state running fuel requirements of the engine 100.

When the conditions exist for providing acceleration enrichment, the acceleration enrichment pulse width computed during each EFI minor cycle routine in the form of a binary number is loaded at step 201 of FIG. 8 into an input register 231. The microprocessor 118 then provides a load acceleration enrichment pulse to enable a gate 232 to load the acceleration enrichment pulse duration number into a down counter 234. Simultaneously, the load acceleration enrichment pulse sets a flip flop 236 whose Q output shifts to a digital logic 1 and whose $\overline{Q}$ output shifts to a digital logic 0. The $\overline{Q}$ output of the flip flop 236 is applied to the second input of the AND gate 230 to disable the clock pulses applied to the down counter 222. The Q output of the flip flop 236 is applied to a second input of the OR gate 228 whose output shifts to a logic 1 when the flip flop 236 is set to energize the fuel injectors 102 and 104 via the injector drivers 134. The down counter 234 is clocked down by clock pulses provided thereto until it is counted down to zero. The resulting carry out pulse supplied by the down counter 234 resets the flip flop 236 whose Q outputs shifts to a digital logic 0 to terminate the acceleration enrichment pulse and whose $\overline{Q}$ output shifts to a digital logic 1 to enable the AND gate 230 to again supply clock pulses to the down counter 222.

The acceleration enrichment pulses are provided each minor cycle with a duration determined in accord with the program flow chart of FIG. 8 to provide for the acceleration enrichment requirements of the engine 100.

As can be seen from the system of FIG. 4 if the injectors 102 and 104 are energized to provide the base fuel pulse for steady state engine requirements at the time that an acceleration enrichment pulse width is initiated at step 201 of FIG. 8, the base fuel pulse is interrupted by the disabling of the clock input to the down counter 222 for the duration of the acceleration enrichment pulse. Thereafter, the down counter 222 is again enabled to complete its count to thereby complete the base fuel pulse requirements for steady state operation. In this manner, the steady state base fuel requirements are summed with the acceleration enrichment requirements.

Referring again to FIG. 8, when the vehicle is operating in neutral or park (hereinafter referred to as a neutral condition) and thereafter shifted into forward or reverse gear (hereinafter referred to as a drive condition), the sudden load on the engine and resulting decrease in the engine speed results in an increase in the manifold absolute pressure resulting in a lean air/fuel ratio excursion and potentially stalling of the engine 100. In accord with this invention, to alleviate the lean air/fuel ratio excursion and resulting deterioration of engine performance, the acceleration enrichment routine 170 illustrated in FIG. 8 provides for fuel enrichment when the system senses a shift in the transmission from a neutral condition to a drive condition and when the change in manifold pressure attains a predetermined value that will occur after a delay each time that the transmission is shifted to a drive condition. In this manner additional fuel is injected into the intake manifold of the engine 100 to prevent the deterioration in engine performance.

When the acceleration enrichment routine of FIG. 8 reaches the decision point 180, the neutral-to-drive (N/D) acceleration enrichment flag in the RAM 122 is sampled to determine whether the system has previously provided for an acceleration enrichment in response to a sensed neutral condition to drive condition transition. If the flag is set indicating that the N/D acceleration enrichment has previously been provided, the program cycle proceeds as previously described. However, if the N/D acceleration enrichment flat is not set indicating that a N/D acceleration enrichment has not been provided, the program proceeds to decision point 238 where the RAM 122 location representing the state of the park/neutral switch 116 is sampled to determine whether the engine transmission is in a neutral condition. If the engine transmission is in a neutral condition, the program proceeds to step 182 and continues as previously described. However, if the transmission is not in a neutral condition representing a shift to a drive condition, the program cycle proceeds to step 240 where the MAP delta determined at step 172 is compared with a constant $k_3$. The value of $k_3$ represents a MAP change that is determined to occur each time the transmission is shifted from a neutral condition to a drive condition. If the MAP delta value has not yet reached the constant $k_3$, the computer program proceeds to step 242 where the MAP delta count is reset to zero so that the MAP rate of change requirement previously described with reference to steps 188 and 190 is disabled as a criteria for N/D acceleration enrichment. Thereafter, the program cycle continues to step 182 and proceeds as previously described.

If at decision point 240, it is determined that the new MAP delta is greater than the constant $k_3$, the program cycle proceeds to step 244 where the N/D acceleration enrichment flag is set to indicate in the next EFI minor loop that the N/D acceleration enrichment has been initiated. Thereafter, the program proceeds to step 246 where the MAP delta count is preset to a constant value $k_4$ obtained from the ROM 120 to provide for a predetermined artificial indication of a rate of change in MAP so that the N/D acceleration enrichment is independent of actual MAP rate of change. The program cycle then proceeds to step 194 where the acceleration enrichment injection counter is set to 1 and the acceleration enrichment pulse width is calculated in accord with the AE multiplier and the base AE pulse width as previously described. Further, during the next EFI minor cycle, the duration of the acceleration enrichment pulse is determined as a function of temperature at step 204 as previously described.

In the foregoing manner, each time that the vehicle transmission is shifted from a neutral condition to a drive condition, fuel enrichment is provided after a time delay imposed by the requirement that MAP delta become greater than the constant $k_4$ to thereby prevent the lean air/fuel ratio excursion previously referred to and to consequently alleviate the undesirable engine performance accompanying the shift in the transmission condition. The enrichment is provided by the acceleration enrichment routine which is enabled in response to the transmission neutral to drive transition independent of the normal acceleration enrichment enabling criteria including rate of change in MAP.

Since the transmission shift and MAP does not change instantaneously with the placement of the transmission gear selector lever into a drive position, the enrichment provided in response to the transmission neutral to drive transient is delayed after the transient occurs until the engine conditions exist at which enrichment is needed. In the embodiment described, enrichment was not initiated until MAP delta reached a constant value $k_4$. In another embodiment, a timer may be employed to impose the delay.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A fuel supply system for an internal combustion engine of a vehicle having an automatic transmission selectively operable in each of neutral and drive conditions, the fuel supply system comprising:

sensor means effective to measure the values of predetermined engine operating parameters, indicative of engine fuel requirements;

means responsive to the values of the predetermined engine operating parameters effective to generate a base fuel signal representing the steady state engine operating fuel requirements;

means effective to sense transient engine operating conditions representing increasing power demand;

means effective to sense a transition from the transmission neutral condition to the drive condition;

fuel enrichment means effective to generate an enrichment signal when the magnitude of the sensed transient engine operating condition exceeds a predetermined value or when a transition from the transmission neutral condition to the transmission drive condition is sensed independent of the predetermined value of transient engine operating condition; and means effective to supply fuel to the internal combustion engine in accord with the base fuel signal and the enrichment signal to thereby provide fuel to the engine substantially in accord with its requirements during steady and transient engine operating conditions and during sudden engine loading conditions resulting from a shift in the transmission from it neutral condition to its drive condition.

2. A fuel supply system for an internal combustion engine of a vehicle having an automatic transmission selectively operable in each of neutral and drive conditions, the fuel supply system comprising:

means responsive to the values of the predetermined engine operating parameters effective to generate a base fuel signal representing the steady state engine operating fuel requirements;

means effective to sense transient engine operating conditions representing increasing power demand;

means effective to sense a transition from the transmission neutral condition to the drive condition;

fuel enrichment means effective to generate an enrichment signal when the magnitude of the sensed transient engine operating condition exceeds a predetermined value, the value of the enrichment signal being determined in part by the magnitude of the transient engine operating condition;

means responsive to a sensed transition from the transmission neutral condition to the drive condition effective to enable the fuel enrichment means to generate the enrichment signal independent of the predetermined value of the transient engine operating condition and having a value determined by a predetermined constant magnitude of the transient engine operating condition independent of the sensed value of the transient engine operating condition; and means effective to supply fuel to the internal combustion engine in accord with the base fuel signal and the enrichment signal to thereby provide fuel to the engine substantially in accord with its requirements during steady and transient engine operating conditions and during sudden engine loading conditions resulting from a shift in the transmission from its neutral condition to its drive condition.

3. A fuel supply system for an internal combustion engine of a vehicle having an automatic transmission selectively operable in each of neutral and drive conditions, the fuel supply system comprising:

means responsive to values of predetermined engine operating parameters effective to generate a base fuel signal representing the steady state engine operating fuel requirements;

means effective to sense a transition from the transmission neutral condition to the drive condition;

fuel enrichment means effective to generate an enrichment signal after a time period from the time of a sensed transition from the transmission neutral condition to the transmission drive condition; and means effective to supply fuel to the internal combustion engine in accord with the base fuel signal and the enrichment signal to thereby provide fuel to the engine substantially in accord with its requirements during steady engine operating conditions and during sudden engine loading conditions resulting from a shift in the transmission from its neutral condition to its drive condition.

* * * * *